United States Patent
Lee et al.

(10) Patent No.: US 9,348,077 B2
(45) Date of Patent: May 24, 2016

(54) METHOD OF MANUFACTURING RETARDER

(75) Inventors: Su-Bin Lee, Busan (KR); Su-Hyun Park, Gyeonggi-do (KR); Sang-Wook Lee, Gyeonggi-do (KR); Jung-Min Lee, Seoul (KR); Byoung-Har Hwang, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 791 days.

(21) Appl. No.: 13/287,244

(22) Filed: Nov. 2, 2011

(65) Prior Publication Data
US 2012/0164345 A1    Jun. 28, 2012

(30) Foreign Application Priority Data

Dec. 23, 2010   (KR) .................. 10-2010-0134026
Sep. 22, 2011   (KR) .................. 10-2011-0095933

(51) Int. Cl.
*B29C 71/02*    (2006.01)
*G02B 5/30*     (2006.01)
*G02B 27/26*    (2006.01)

(52) U.S. Cl.
CPC .............. *G02B 5/3083* (2013.01); *G02B 27/26* (2013.01)

(58) Field of Classification Search
CPC ...... G02B 5/3083; G02B 5/32; G02B 5/3016; G02B 27/26
USPC .............. 427/508, 162, 163.1, 542, 541, 553, 427/558, 595
See application file for complete search history.

(56) References Cited

U.S. PATENT DOCUMENTS

| | | | |
|---|---|---|---|
| 5,861,931 A | 1/1999 | Gillian et al. | |
| 6,743,487 B2* | 6/2004 | Sakai et al. | 428/1.2 |
| 6,894,751 B2* | 5/2005 | Payne et al. | 349/117 |
| 2004/0241319 A1* | 12/2004 | Sa et al. | 427/162 |
| 2006/0098281 A1 | 5/2006 | Fukushima et al. | |
| 2006/0240196 A1* | 10/2006 | Shutou et al. | 428/1.3 |
| 2008/0239485 A1 | 10/2008 | Kuroda et al. | |
| 2008/0273149 A1 | 11/2008 | Jeng et al. | |
| 2010/0068419 A1* | 3/2010 | Kim et al. | 428/1.23 |
| 2010/0073604 A1* | 3/2010 | Okuyama et al. | 349/75 |

(Continued)

FOREIGN PATENT DOCUMENTS

| | | |
|---|---|---|
| CN | 1705903 A | 12/2005 |
| CN | 101750663 A | 6/2010 |
| CN | 102540316 A | 7/2012 |

(Continued)

OTHER PUBLICATIONS

Taiwan Office Action dated Mar. 27, 2014 for TW Application No. 100138959.

(Continued)

*Primary Examiner* — Michael Wieczorek
(74) *Attorney, Agent, or Firm* — Morgan, Lewis & Bockius LLP

(57) ABSTRACT

A method of manufacturing a patterned retarder includes forming a retarder material layer by applying a retarder material to a substrate; drying the retarder material layer at a first temperature; exposing the retarder material layer to linearly-polarized UV, wherein the retarder material layer has an optical anisotropic property; and heat treating the retarder material layer at a second temperature higher than the first temperature to increase the optical anisotropic property of the retarder material layer.

10 Claims, 16 Drawing Sheets

(56) References Cited

U.S. PATENT DOCUMENTS

2010/0149472 A1    6/2010  Hoshi
2012/0141689 A1*  6/2012  Park .............................. 427/493

FOREIGN PATENT DOCUMENTS

| | | |
|---|---|---|
| JP | 2008-257207 A | 10/2008 |
| TW | 200827930 A | 7/2008 |
| TW | 200844602 A | 11/2008 |
| TW | 200904950 A | 2/2009 |
| WO | WO 2005012990 A1 * | 2/2005 |

OTHER PUBLICATIONS

Chinese Office Action dated Dec. 10, 2013 for corresponding Chinese application No. 201110438917.6.

* cited by examiner

METHOD OF MANUFACTURING RETARDER

This application claims the benefit of Korean Patent Applications No. 10-2010-0134026 filed in Korea on Dec. 23, 2010 and No. 10-2011-0095933 filed in Korea on Sep. 22, 2011, which are hereby incorporated by reference for all purposes as if fully set forth herein.

BACKGROUND OF THE INVENTION

1. Field of the Invention

The invention relates to a display device, and more particularly, to a method of manufacturing a retarder for a three-dimensional image display device.

2. Discussion of the Related Art

Recently, with a user's request for a display device displaying a three-dimensional image having an actual feeling, three-dimensional image display devices have been researched and developed. In general, a stereoscopic image expressing a three-dimension is displayed using a principle of stereovision through eyes. Accordingly, three-dimensional image display devices that display an image of a stereoscopic effect using a binocular disparity due to a separation distance of eyes, e.g., about 65 mm have been suggested. When distinct two-dimensional images of a three-dimensional image display device are viewed to right and left eyes, respectively, the distinct two-dimensional images are transmitted to a brain and are combined to a three-dimensional image having depth effect and reality by the brain. This phenomenon may be referred to as a stereography.

For example, a three-dimensional image display device includes a display panel displaying images, a patterned retarder attached to the outer side of the display panel, and glasses selectively transmitting the images that pass through the patterned retarder from the display panel.

The patterned retarder enables left-eye and right-eye images of two-dimensional images from the display panel to have different phases for each other. For example, the patterned retarder makes the left-eye images left-circularly polarized and the right-eye images right-circularly polarized. By the way, to do this, manufacturing processes of the patterned retarder are very complicated.

FIGS. 1A to 1G are cross-sectional views in steps of a manufacturing method of a patterned retarder according to the related art.

In FIG. 1A, a high molecular substance, which reacts with ultraviolet (UV) light and thus its polymer chains are arranged along a certain direction, is applied to a substrate 10 using a coating apparatus 90 to thereby form a photoalignment layer 20 substantially on an entire surface of the substrate 10. The photoalignment layer 20 includes many disordered polymer chains (not shown).

In FIG. 1B, the substrate 10 including the photoalignment layer 20 thereon is disposed on a drying plate (not shown), which has a surface temperature of 90 degrees of Celsius to 130 degrees of Celsius. A drying process of heating the substrate 10 for several seconds to several minutes is carried out, thereby drying the photoalignment layer 20 and removing a solvent in the photoalignment layer 20.

In FIG. 1C, a first photomask 70 including light-transmitting portions TA and light-blocking portions BA is disposed over the cured photoalignment layer 20. Then, first polarized UV light is irradiated to the cured photoalignment layer 20 through the first photomask 70 to thereby form first alignment areas 21, which are exposed to the first polarized UV light and are selectively aligned along a first direction. That is, the first polarized UV light is irradiated to a portion corresponding to ones of left-eye image pixel rows and right-eye image pixel rows, and the polymer chains (not shown) in the portion are arranged along the first direction. On the other hand, in a portion of the photoalignment layer 20 which is not exposed to the first polarized UV light, the polymer chains (not show) still remain disordered.

Accordingly, the photoalignment layer 20 includes the first alignment areas 21 in which the polymer chains are well arranged along the first direction and non-alignment areas in which the polymer chains are disorderedly arranged due to the selective irradiation of the first polarized UV light.

In FIG. 1D, a second photomask 72 including light-transmitting portions TA and light-blocking portions BA is disposed over the photoalignment layer 20 having the first alignment areas 21 and the non-alignment areas. Here, the blocking portions BA correspond to the first alignment areas 21, and the light-transmitting portions TA correspond to the non-alignment areas. Then, second polarized UV light is irradiated to the photoalignment layer 20 through the second photomask 72 to thereby form second alignment areas 23, which correspond to the light-transmitting portions TA of the second photomask 72 and in which the polymer chains are arranged along a second direction perpendicular to the first direction.

Next, in FIG. 1E, a liquid crystal material that is able to be hardened by UV light, for example, reactive mesogen (RM) is applied to the photoalignment layer 20 including the first and second alignment areas 21 and 23 by a predetermined thickness to thereby form a RM layer 40.

Here, the RM layer 40 includes first phase portions 44 and second phase portions 46 due to the photoalignment layer 20. More particularly, RM molecules 42 of the RM layer 40 corresponding to the first alignment areas 21 are aligned due to the polymer chains arranged along the first direction to thereby form the first phase portions 44, and RM molecules 42 of the RM layer 40 corresponding to the second alignment areas 23 are aligned due to the polymer chains arranged along the second direction to thereby form the second phase portions 46.

In FIG. 1F, non-polarized UV light is irradiated to the RM layer 40 including the first and second phase portions 44 and 46 of FIG. 1E, thereby hardening the RM layer 40.

In FIG. 1G, the substrate 10 including the RM layer 40 hardened by the non-polarized UV light thereon is carried into a curing apparatus 96. The substrate 10 is exposed to an environment including a temperature of 50 degrees of Celsius to 100 degrees of Celsius for several minutes to several ten minutes, and the RM layer 40 hardened by the UV light is cured to be further hardened.

By performing the curing processes such as the UV irradiation and heating, the RM layer 40 includes first phase patterns 50 where the RM molecules 42 are aligned along the first direction and second phase patterns 52 where the RM molecules 42 are aligned along the second direction perpendicular to the first direction. A patterned retarder 1 is completed through the above-mentioned processes.

However, as stated above, the manufacturing processes of the related art patterned retarder 1 are very complicated because of applying a material for the photoalignment layer 20, drying and curing the photoalignment layer 20, two separate exposures using polarized UV lights, applying the RM layer 40, and UV hardening and curing the RM layer 40. This causes an increase in manufacturing costs.

SUMMARY OF THE INVENTION

Accordingly, the present invention is directed to a method of manufacturing a patterned retarder that substantially obviate one or more of the problems due to limitations and disadvantages of the related art.

An object of the present invention is to provide to a method of manufacturing a patterned retarder that simplifies the manufacturing processes and decreases the manufacturing costs.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a method of manufacturing a patterned retarder includes forming a retarder material layer by applying a retarder material to a substrate; drying the retarder material layer at a first temperature; exposing the retarder material layer to linearly-polarized UV, wherein the reatder material layer has an optical anisotropic property; and heat treating the retarder material layer at a second temperature higher than the first temperature to increase the optical anisotropic property of the retarder material layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1A:
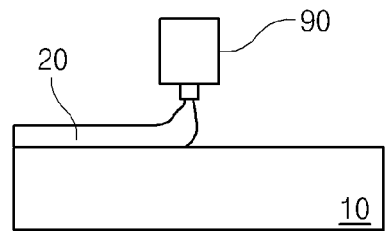
FIGS. 1A to 1G are cross-sectional views in steps of a manufacturing method of a patterned retarder according to the related art.
Figure 1B:
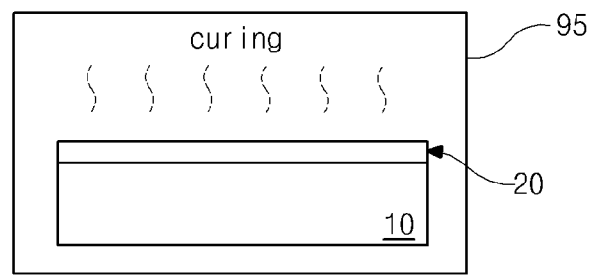
Figure 1C:
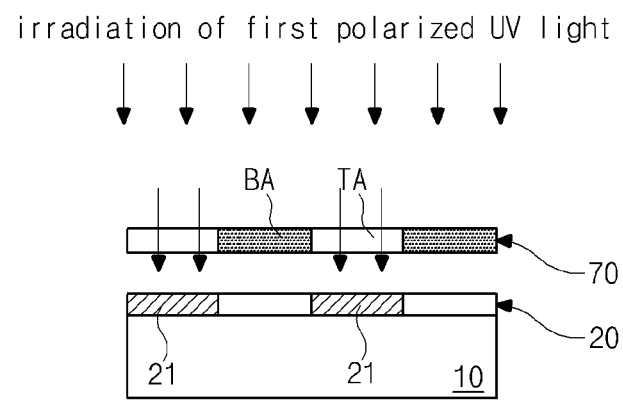
Figure 1D:
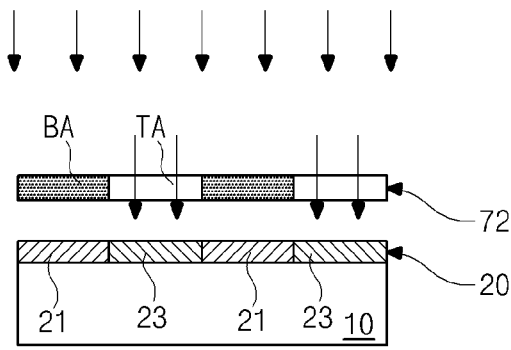
Figure 1E:
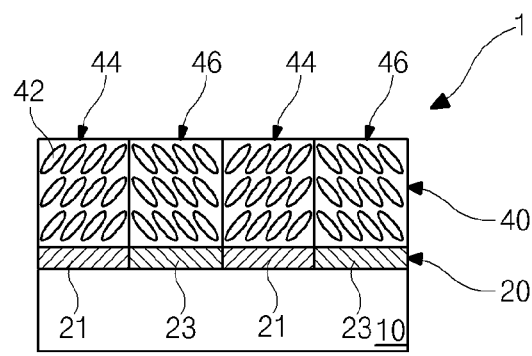
Figure 1F:
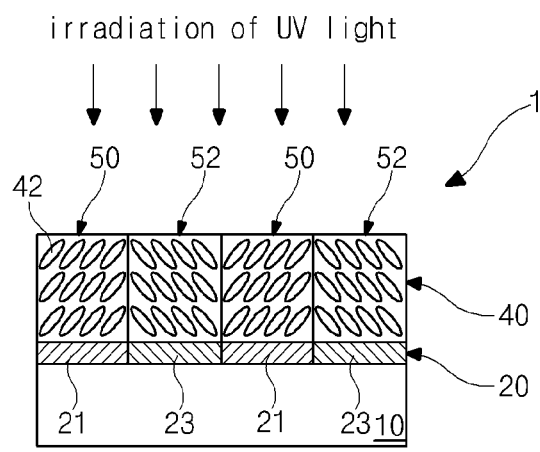
Figure 1G:
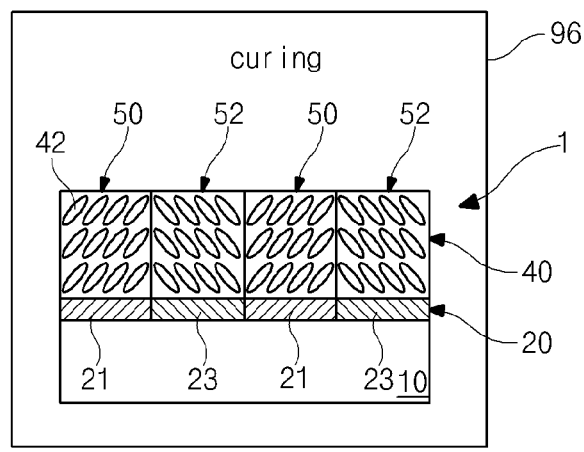
Figure 2:
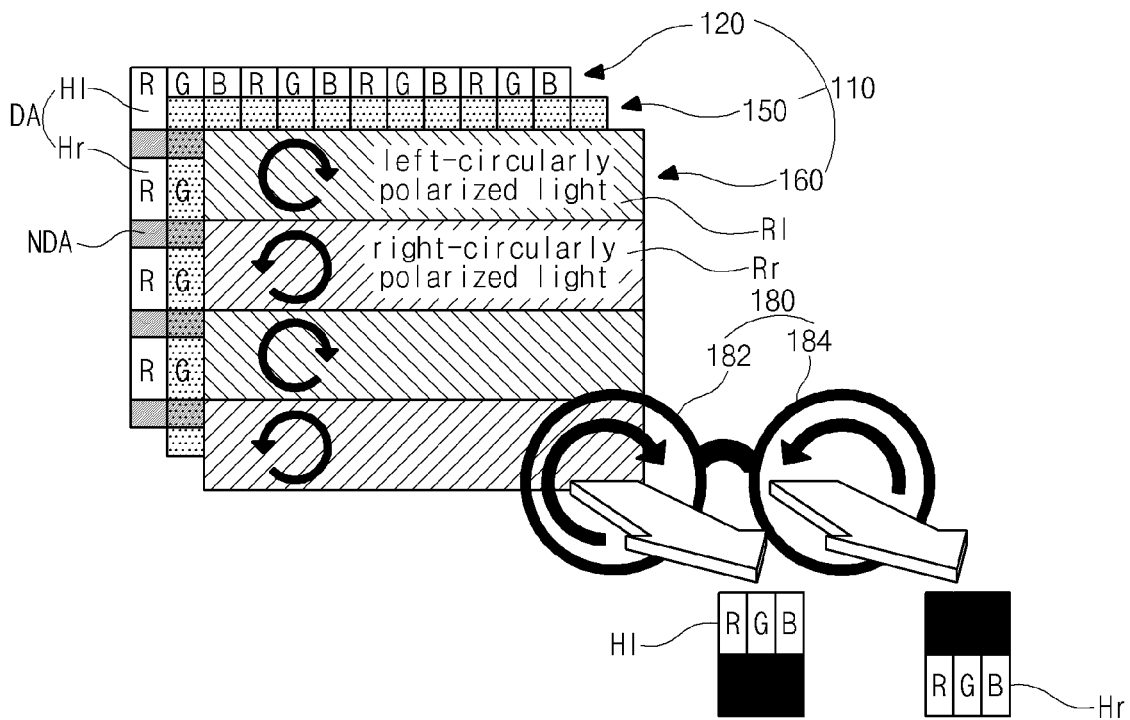
FIG. 2 is a perspective view of illustrating a polarized glasses-type three-dimensional image display device according to the present invention.

FIG. 2 is a perspective view of illustrating a polarized glasses-type three-dimensional image display device according to the present invention.

In FIG. 2, the polarized glasses-type three-dimensional image display device 110 according to the present invention includes a display panel 120 displaying an image, a polarizing film 150 over the display panel 120, and a patterned retarder 160 over the polarizing film 150.

The display panel 120 includes display areas DA substantially displaying the image and non-display areas NDA between adjacent display areas DA. The display areas DA include left-eye horizontal pixel lines Hl and right-eye horizontal pixel lines Hr.

The left-eye horizontal pixel lines Hl displaying a left-eye image and the right-eye horizontal pixel lines Hr displaying a right-eye image are alternately arranged along a vertical direction of the display panel 120 in the context of the figure. Red, green and blue sub-pixels R, G and B are sequentially arranged in each of the left-eye horizontal pixel lines Hl and the right-eye horizontal pixel lines Hr.

Flat panel displays such as liquid crystal display panels and organic electro-luminescent display panels may be used as the display panel 120.

The polarizing film 150 changes the left-eye image and the right-eye image displayed by the display panel 120 into a linearly-polarized left-eye image and a linearly-polarized right-eye image, respectively, and transmits the linearly-polarized left-eye image and the linearly-polarized right-eye image to the patterned retarder 160.

The patterned retarder 160 includes left-eye retarders Rl and right-eye retarders Rr. The left-eye retarders Rl and the right-eye retarders Rr correspond to the left-eye horizontal pixel lines Hl and the right-eye horizontal pixel lines Hr, respectively, and are alternately arranged along the vertical direction of the display panel 120 in the context of the figure. The left-eye retarders Rl change linearly-polarized light into left-circularly polarized light, and the right-eye retarders Rr change linearly-polarized light into right-circularly polarized light.

Therefore, a left-eye image displayed by the left-eye horizontal pixel lines Hl of the display panel 120 is linearly polarized when passing through the polarizing film 150, is left-circularly polarized when passing through the left-eye retarders Rl of the patterned retarder 160, and is transmitted to the viewer. A right-eye image displayed by the right-eye horizontal pixel lines Hr of the display panel 120 is linearly polarized when passing through the polarizing film 150, is right-circularly polarized when passing through the right-eye retarders Rr of the patterned retarder 160, and is transmitted to the viewer.

Polarized glasses 180 which the viewer wears include a left-eye lens 182 and a right-eye lens 184. The left-eye lens 182 transmits only left-circularly polarized light, and the right-eye lens 184 transmits only right-circularly polarized light.

Accordingly, among the images transmitted to the viewer, the left-circularly polarized left-eye image is transmitted to the left-eye of the viewer through the left-eye lens 182, and the right-circularly polarized right-eye image is transmitted to the right-eye of the viewer through the right-eye lens 184. The viewer combines the left-eye image and the right-eye image respectively transmitted to the left-eye and the right-eye and realizes a three-dimensional stereoscopic image.

Here, the patterned retarder 160 of the present invention does not include an alignment layer. A method of manufacturing the patterned retarder 160 will be described hereinafter with reference to FIGS. 3A to 3E.

FIGS. 3A to 3E are cross-sectional views in steps of a manufacturing method of a patterned retarder according to a first embodiment of the present invention.

Figure 3A:
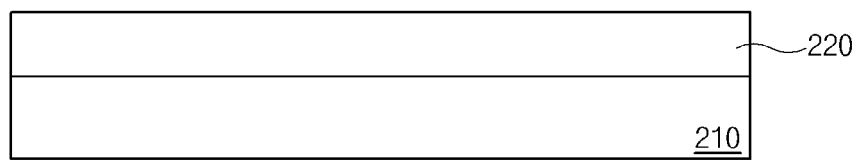
FIGS. 3A to 3E are cross-sectional views in steps of a manufacturing method of a patterned retarder according to a first embodiment of the present invention.

In FIG. 3A, a liquid-type retarder material is applied to a transparent insulating substrate 210 using a coating apparatus such as a spin coating apparatus, and a retarder material layer 220 having a thickness of about 0.5 μm to about 2 μm is formed on a substantially entire surface of the substrate 210. Here, when the retarder material is spin-coated, a rotation speed may be about 500 rpm, and coating time may be about 30 seconds.

Meanwhile, the retarder material may have the viscosity of about 1 mPa·s to about 50 mPa·s when the retarder material is dissolved in a solvent to form a solution.

Figure 3B:
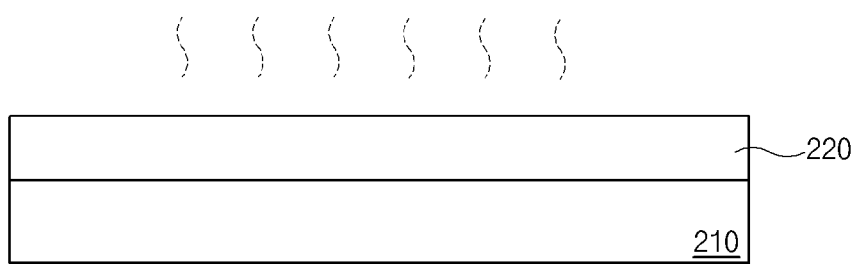

In FIG. 3B, the substrate 210 including the retarder material layer 220 thereon is disposed on a drying apparatus having a surface temperature of about 80 degrees of Celsius, for example, a hot plate (not shown). The substrate 210 is heated for about two minutes, thereby removing the solvent in the retarder material layer 220 and drying the retarder material layer 220. This may be called a drying process.

Figure 3C:
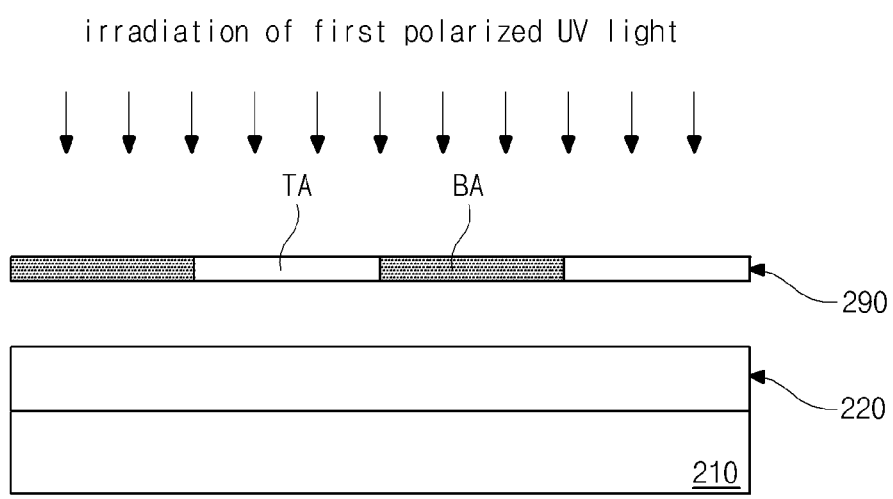

In FIG. 3C, a first mask 290 including light-transmitting portions TA and light-blocking portions BA is disposed over and parallel to the substrate 210 including the retarder material layer 220 that is dried using the drying apparatus. The light-transmitting portions TA and the light-blocking portions BA have stripe shapes and alternate with each other.

Next, first polarized UV light is irradiated to the substrate 210 including the pre-baked retarder material layer 220 thereon through the first mask 290, and the retarder material layer 220 corresponding to the light-transmitting portions TA of the first mask 290 is exposed to the first polarized UV light. At this time, the first polarized UV light may have an intensity of about 4 mW/cm² at a wavelength of about 313±10 nm, and the energy of the first polarized UV light may be about 4 mJ/cm² to about 40 mJ/cm².

Figure 3D:
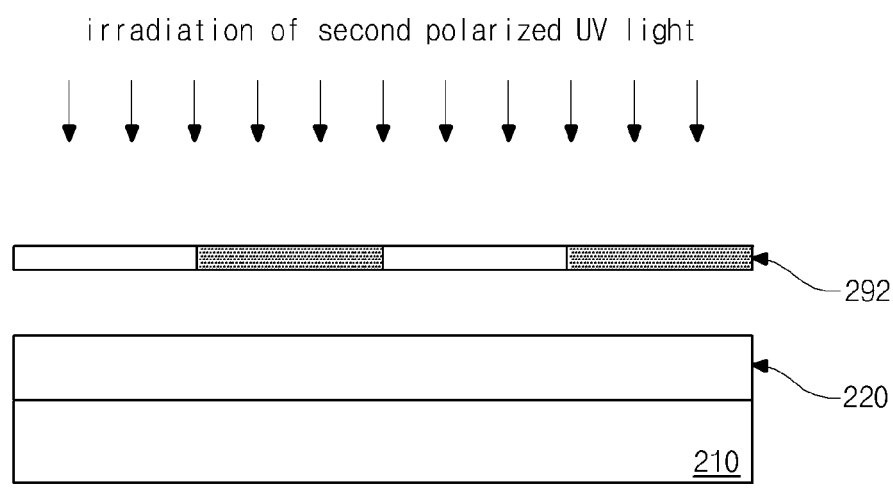

In FIG. 3D, after removing the first mask 290 of FIG. 3C, the substrate 210 including the retarder material layer 220 exposed to the first polarized UV light thereon is rotated by 90 degrees. Then, a second mask 292, which includes stripe-type light-transmitting portions TA and stripe-type light-blocking portions BA alternating with each other, is disposed over the retarder material layer 220 exposed to the first polarized UV light.

At this time, the second mask 292 is positioned such that the light-blocking portions BA correspond to and completely shield first areas of the retarder material layer 220 which are exposed to the first polarized UV light and the light-transmitting portions TA correspond to second areas of the retarder material layer 220 which are not exposed to the first polarized UV light.

Next, second polarized UV light is irradiated to the retarder material layer 220 through the second mask 292. At this time, the second polarized UV light may have an intensity of about 4 mW/cm² at a wavelength of about 313±10 nm, and the energy of the second polarized UV light may be about 4 mJ/cm² to about 40 mJ/cm².

Figure 3E:
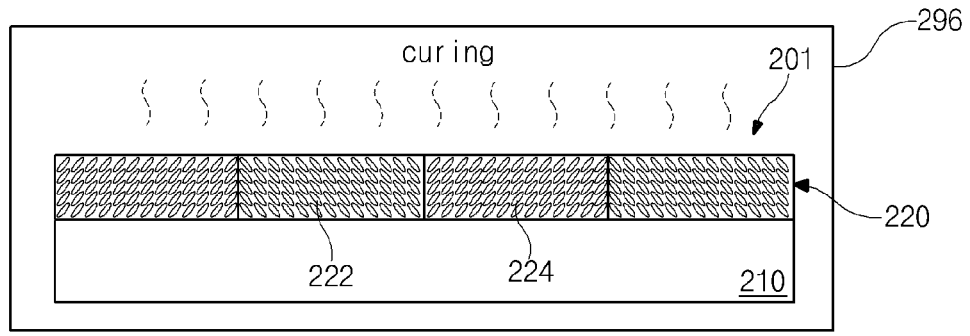

In FIG. 3E, the substrate 210 including the retarder material layer 220 exposed to the first and second polarized UV lights thereon is disposed in a curing apparatus 296 having an inside temperature of about 140 degrees of Celsius, for example, an oven, and the retarder material layer 220 is cured for about ten minutes to thereby complete a patterned retarder 201. The curing process of the retarder material layer 220 using the curing apparatus 296 may be called a heat treatment process.

After the heat treatment process, the retarder material layer 220 may have retardation along a direction perpendicular to the irradiation direction of the polarized UV light. Namely, the retarder material layer 220 for the patterned retarder 201 according to the present invention may maintain an isotropic property until it is exposed to the polarized UV light, and the retarder material layer 220 may have an anisotropic property when the heat treatment process is performed after irradiating the polarized UV lights. By irradiating the first and second polarized UV light having different polarization directions, the retarder material layer 220 includes first phase patterns 222 and second phase patterns 224 that have different arrangements to have the anisotropic properties along different directions in the first areas and the second areas and change linearly polarized light into left-circularly polarized light and right-circularly polarized light, respectively.

As stated above, the patterned retarder 201 manufactured according to the present invention does not need a photoalignment layer. Therefore, since steps of applying a photoalignment material and drying and curing the photoalignment material are not performed as compared with the related art, the manufacturing processes are simplified, and the manufacturing costs are decreased.

By the way, the patterned retarder manufactured according to the first embodiment of the present invention may have retardation values different from the desirable value.

Figure 4:
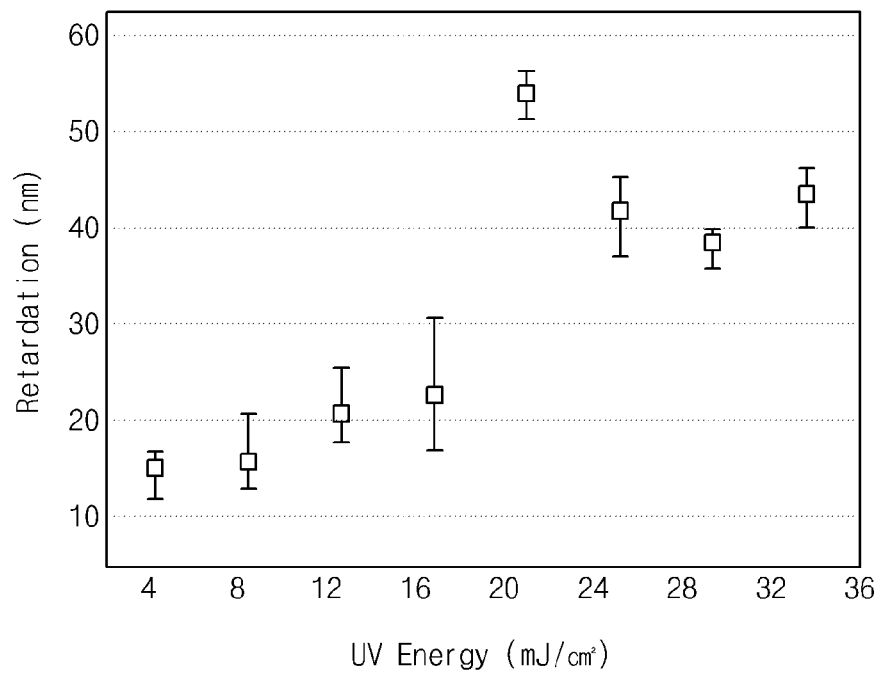
FIG. 4 is a graph of illustrating retardation values of a patterned retarder according to the first embodiment of the present invention depending on UV energy.

FIG. 4 is a graph of illustrating retardation values of a patterned retarder according to the first embodiment of the present invention depending on UV energy.

In FIG. 4, the patterned retarder manufactured according to the first embodiment of the present invention may have the maximum retardation value less than 60 nm, which is smaller than the haft of about 125 nm, the retardation value of a λ/4 plate.

The retardation value depends on a refractive index and a thickness. Since the refractive index of the patterned retarder according to the present invention is affected by UV energy and curing temperatures and the thickness is influenced by a rotational speed in a spin-coating process, the retardation value may be varied depending on the manufacturing processes.

A method of manufacturing a patterned retarder according to a second embodiment of the present invention will be described hereinafter with reference to FIGS. 5A to 5F. FIGS. 5A to 5F are cross-sectional views in steps of a manufacturing method of a patterned retarder according to a second embodiment of the present invention.

Figure 5A:
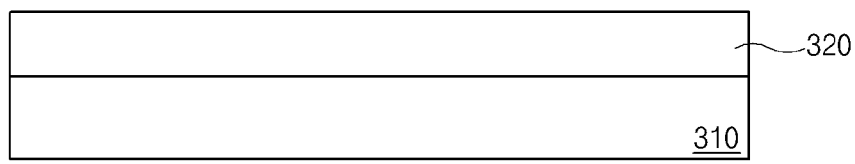
FIGS. 5A to 5F are cross-sectional views in steps of a manufacturing method of a patterned retarder according to a second embodiment of the present invention.

In FIG. 5A, a liquid-type retarder material is applied to a transparent insulating substrate 310 using a spin-coating apparatus, and a retarder material layer 320 having a thickness of about 0.5 μm to about 2 μm is formed on a substantially entire surface of the substrate 310. Here, the solid content excluding the solvent may have the concentration of about 10 wt % to about 25 wt %.

The rotational speed and time of spin-coating are important factors that enable the retarder material layer 320 to have a uniform thickness.

Figure 6:
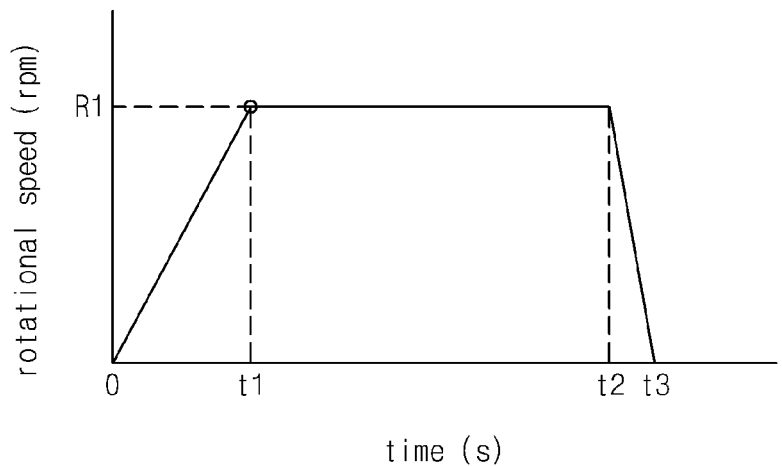
FIG. 6 is a graph of illustrating the rotational speed depending on time of spin-coating in a method of manufacturing a patterned retarder according to the second embodiment of the present invention.

FIG. 6 is a graph of illustrating the rotational speed depending on time of spin-coating in a method of manufacturing a patterned retarder according to the second embodiment of the present invention. In FIG. 6, to uniformly apply the retarder material, rotation starts, and first time t1 is spent enough until the rotational speed increases and reaches the optimum rotational speed R1 for spin-coating. Spin-coating is performed at the optimum rotational speed R1 for second time t2-t1. Then the rotational speed decreases for third time t3-t2, and spin-coating ends. At this time, it is desirable that the optimum rotational speed R1 of spin-coating is about 700 rpm to about 5000 rpm, the first time t1 is about 10 seconds, the second time t241 for spin-coating is about 10 seconds to about 30 seconds, and the third time t3-t2 is about 2 seconds.

The rotational speed R1 depends on the size of the substrate 310. The rotational speed R1 decreases as the size of the substrate 310 increases. For example, when the size of the substrate 310 is about 50 mm×50 mm, the rotational speed R1 of spin-coating may be about 4000 rpm. When the size of the substrate 310 is about 370 mm×470 mm, the rotational speed R1 of spin-coating may be about 1100 rpm.

Figure 5B:
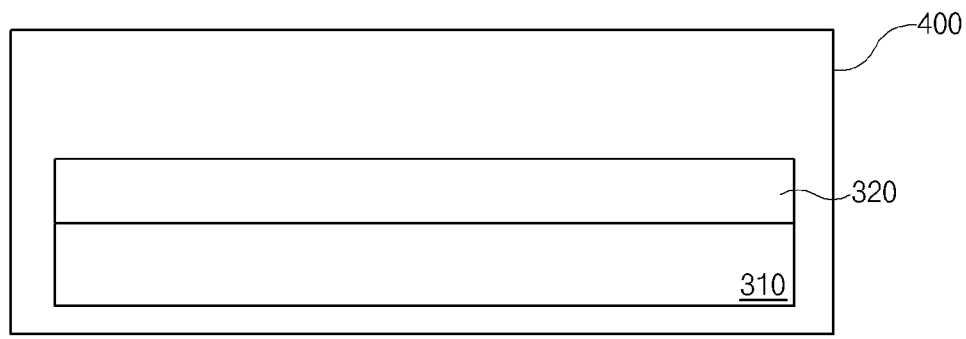

In FIG. 5B, the substrate 310 including the retarder material layer 320 thereon is disposed in a vacuum apparatus 400, and a process of drying the retarder material layer 320 under vacuum is performed for about 60 seconds. This may be called a vacuum drying process. At this time, the pressure in the vacuum apparatus 400, beneficially, may be about 0.1 torr to about 10 torr. The vacuum drying step is carried out to help removing the solvent before a drying process.

Figure 5C:
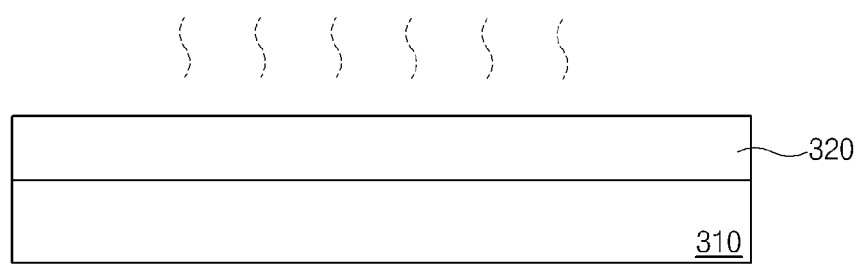

In FIG. 5C, the substrate 310 including the vacuum dried retarder material layer 320 thereon are disposed on a drying apparatus having a surface temperature of about 90 degrees of Celsius, for example, a hot plate (not shown). The substrate 310 is heated for about 1 minute to about 30 minutes, thereby removing the solvent in the retarder material layer 320. This may be called a drying process.

Figure 5D:
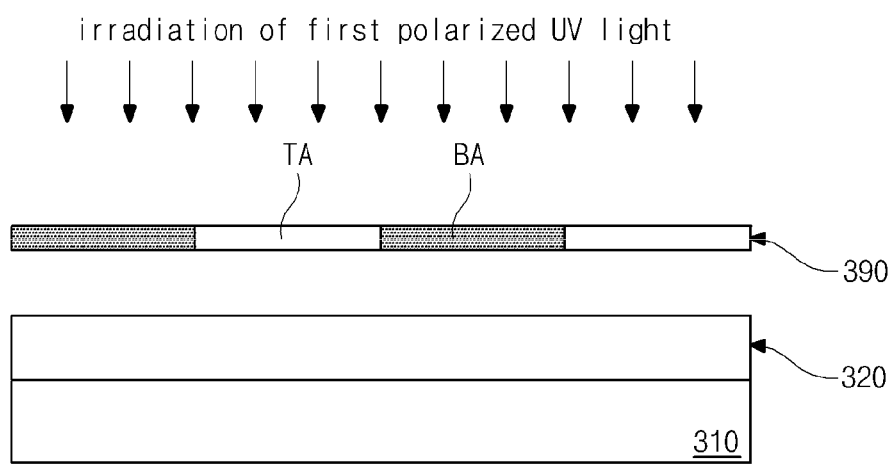

In FIG. 5D, a first mask 390 including light-transmitting portions TA and light-blocking portions BA is disposed over and parallel to the substrate 310 including the retarder material layer 320 that is dried using the drying apparatus. The light-transmitting portions TA and the light-blocking portions BA have stripe shapes and alternate with each other.

Next, first polarized UV light is irradiated to the substrate 310 including the dried retarder material layer 320 thereon through the first mask 390, and the retarder material layer 320 corresponding to the light-transmitting portions TA of the first mask 390 is exposed to the first polarized UV light. At this time, the first polarized UV light may have an intensity of about 4 mW/cm$^2$ at a wavelength of about 313±10 nm, and the energy of the first polarized UV light may be about 100 mJ/cm$^2$ to about 500 mJ/cm$^2$.

Figure 5E:
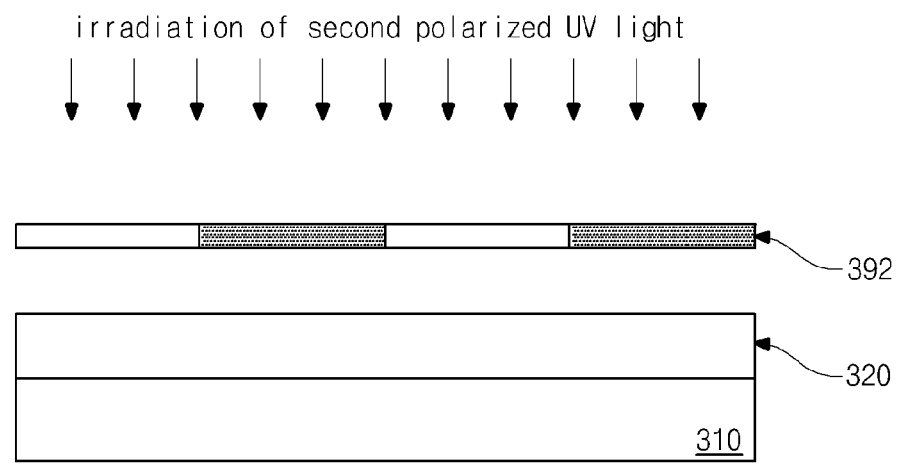

In FIG. 5E, after removing the first mask 390 of FIG. 5D, the substrate 310 including the retarder material layer 320 exposed to the first polarized UV light thereon is rotated by 90 degrees. Then, a second mask 392, which includes stripe-type light-transmitting portions TA and stripe-type light-blocking portions BA alternating with each other, is disposed over the retarder material layer 320 exposed to the first polarized UV light.

At this time, the second mask 392 is positioned such that the light-blocking portions BA correspond to and screen first areas of the retarder material layer 320 which are exposed to the first polarized UV light and the light-transmitting portions TA correspond to second areas of the retarder material layer 320 which are not exposed to the first polarized UV light.

Next, second polarized UV light is irradiated to the retarder material layer 320 through the second mask 392. At this time, the second polarized UV light may have an intensity of about 4 mW/cm$^2$ at a wavelength of about 313±10 nm, and the energy of the second polarized UV light may be about 100 mJ/cm$^2$ to about 500 mJ/cm$^2$.

Here, the first and second polarized UV lights may have the same polarized direction. However, the first and second polarized UV lights having different polarization directions may be used, and in this case, the step of rotating the substrate 310 by 90 degrees may be unnecessary.

Figure 5F:
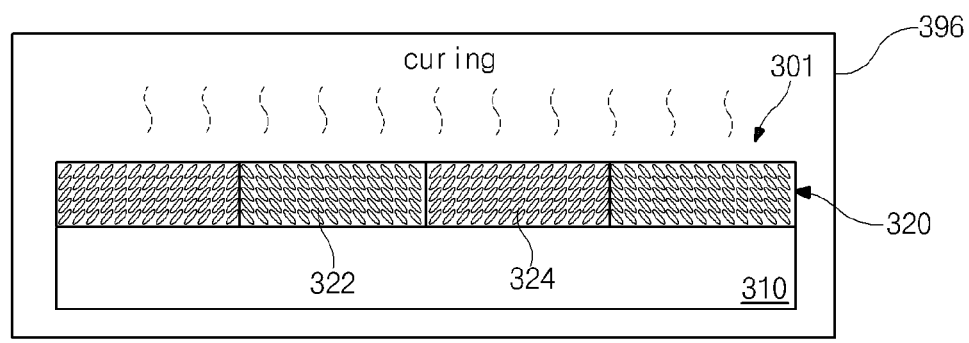

In FIG. 5F, the substrate 310 including the retarder material layer 320 exposed to the first and second polarized UV lights thereon is disposed in a curing apparatus 396 having an inside temperature of about 80 degrees of Celsius to about 150 degrees of Celsius, for example, an oven. The retarder material layer 220 is exposed to the temperature cured of about 110 to about 150 degrees of Celsius, desirably about 140 degrees of Celsius, for about 20 minutes and is cured to thereby complete a patterned retarder 301. The curing process of the retarder material layer 320 using the curing apparatus 296 may be called a heat treatment process.

After the heat treatment process, the retarder material layer 320 may have retardation along a direction perpendicular to the irradiation direction of the polarized UV light. Namely, the retarder material layer 320 for the patterned retarder 301 according to the present invention may maintain an isotropic property until it is exposed to the polarized UV light, and the retarder material layer 320 may have an anisotropic property when the heat treatment process is performed after irradiating the polarized UV lights. By differently irradiating the first and second polarized UV light with the properties, the retarder material layer 320 includes first phase patterns 322 and second phase patterns 324 that have different arrangements to have the anisotropic properties along different directions in the first areas and the second areas and change linearly polarized light into left-circularly polarized light and right-circularly polarized light, respectively.

Accordingly, in the second embodiment of the present invention, the vacuum drying process is added, and each process is performed under predetermined conditions, whereby the desirable retardation value can be obtained.

Figure 7:
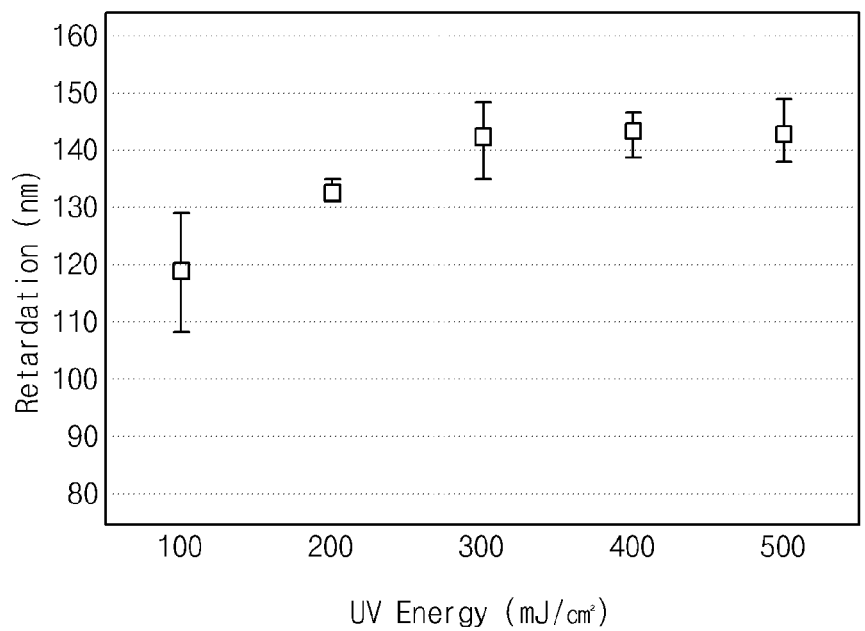
FIG. 7 is a graph of illustrating retardation values of a patterned retarder according to the second embodiment of the present invention depending on UV energy.

FIG. 7 is a graph of illustrating retardation values of a patterned retarder according to the second embodiment of the present invention depending on UV energy. Table 1 shows retardation values of the patterned retarder according to the second embodiment measured at top, middle and bottom points (P1, P2, P3) with respect to the center of the substrate 310 depending on the UV energy.

TABLE 1

|  | 100 mJ/cm$^2$ | 200 mJ/cm$^2$ | 300 mJ/cm$^2$ | 400 mJ/cm$^2$ | 500 mJ/cm$^2$ |
|---|---|---|---|---|---|
| P1 | 109 | 133 | 150 | 148 | 139 |
| P2 | 119 | 136 | 144 | 146 | 143 |
| P3 | 130 | 132 | 136 | 140 | 150 |
| average | 119 | 134 | 143 | 144 | 144 |

From these, it is noted that the patterned retarder according to the second embodiment of the present invention has the retardation value approaching 125 nm corresponding to λ/4.

In the meantime, the patterned retarder may be manufactured under the conditions: the size of the substrate is about 50 mm×50 mm, the solid content has the concentration of about 20 wt %, the rotational speed 4000 rpm, a retarder material is spin-coated for about 30 seconds to thereby form a retarder material layer, the retarder material layer is vacuum-dried under the pressure of about 0.2 torr for about 60 seconds, the retarder material layer is dried under the temperature of about 90 degrees of Celsius, first and second polarized UV lights having the intensity of about 4 mW/cm$^2$ at a wavelength of about 313±10 nm are irradiated to the retarder material layer such that the energy of the first polarized UV light is about 100 mJ/cm$^2$ to about 500 mJ/cm$^2$, and the retarder material layer is heat treated under the temperature of about 140 degrees of Celsius for about 20 minutes. In this case, the patterned retarder may have the retardation value of about 130 nm.

A method of manufacturing a patterned retarder according to a third embodiment of the present invention will be described hereinafter with reference to FIG. 8.

Figure 8:
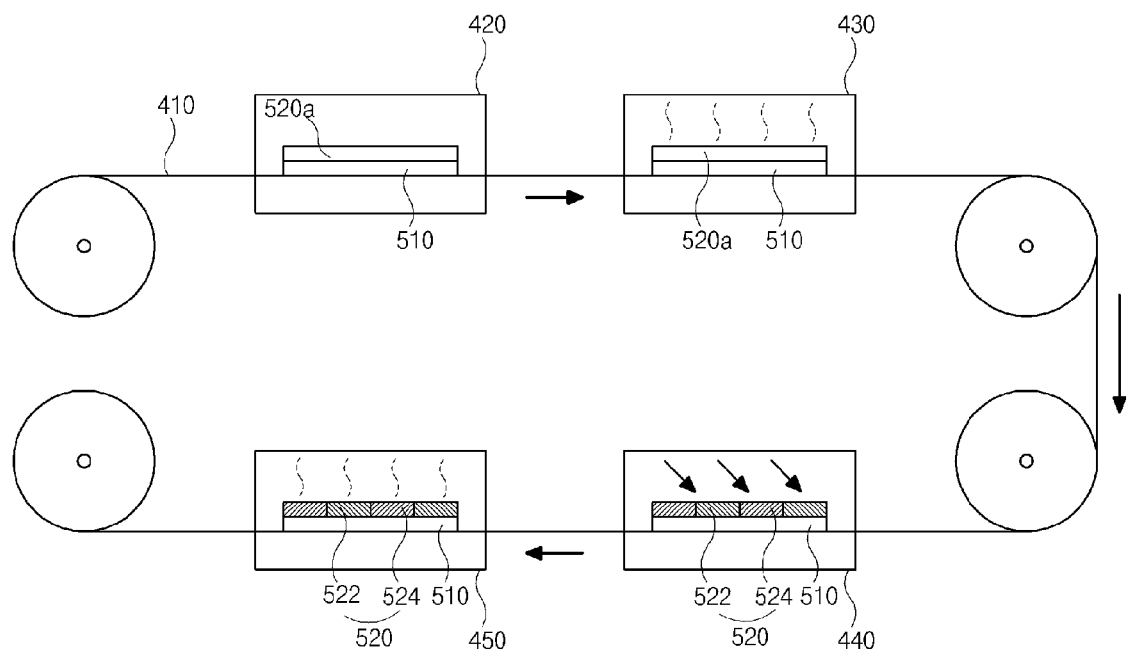
FIG. 8 is a schematic view for explaining manufacturing processes of a patterned retarder according to the third embodiment of the present invention.

FIG. 8 is a schematic view for explaining manufacturing processes of a patterned retarder according to the third embodiment of the present invention.

In FIG. 8, a system for manufacturing a patterned retarder according to the third embodiment of the present invention includes a substrate-transferring apparatus 410, a coating apparatus 420, a drying apparatus 430, a light-exposing apparatus 440 and a heat treatment apparatus 450. While a substrate 510 sequentially passes through the apparatuses 420, 430, 440 and 450 by the substrate-transferring apparatus 410, the substrate 510 goes through a coating process of uniformly applying a solution, a drying process of removing a solvent, a light-exposing process of irradiating linearly-polarized light, and a heat treatment process of heating under a predetermined temperature, and thus a patterned retarder 520 is formed on the substrate 510. At this time, the substrate-transferring apparatus 410 may include a conveyor belt and rollers, and the system may be an in-line type.

The substrate 510 is transferred into the coating apparatus 420 by the substrate-transferring apparatus 410, and a coating process of applying a retarder material is performed to thereby form a retarder material layer 520a on the substrate 510. Here, various coating methods can be used, and it is beneficial to use a coating method, which enables a uniform film having a thickness less than 5 micrometers to be formed. For example, a spin-coating method, a slit-coating method, a doctor blade method, a spin and slit coating method, a roll-to-roll coating method or a cast coating method can be used.

The substrate 510, beneficially, may be transparent within a range of visible rays and may include glass, plastic, polymethyl methacrylate, polycarbonate, polyvinyl chloride, triacetyl cellulose (TAC) or cyclo olefin polymer (COP). When the substrate 510 may be TAC or COP, which is flexible, it is desirable to use the slit coating method or the roll-to-roll coating method such that the substrate 510 may not be wrinkled.

Alternatively, the polarizing film 150 of the display device 110 of FIG. 2 may be used as the substrate 510.

Here, the retarder material has a photo-aligned property and a photo-sensitized property. The retarder material includes a photosensitive group, which shows an optical anisotropic property when linearly-polarized light is irradiated, and a liquid crystal polymer, a liquid crystal monomer, an oligomer or a their mixture having a mesogen group, which shows a liquid crystal property within a range of predetermined temperatures. Namely, in addition to the photosensitive group, the retarder material may include only polymers, include only monomers or oligomers, or include mixed polymers and oligomers. When the linearly-polarized light is irradiated, photo-isomerization occurs, and the retarder material has a relatively low optical anisotropic property. The optical anisotropic property of retarder material may be further increased by a heat treatment process under more than a predetermined temperature. Moreover, the retarder material has a retardation axis due to the optical anisotropic property after being exposed to linearly-polarized light, and the retardation axis is perpendicular to a polarization axis of the linearly-polarized light. A retardation axis formed through first light-exposing can be changed due to second light-exposing.

Meanwhile, the retarder material may include a leveling additive agent for flattening and other additive agents.

Next, the substrate 510 including the retarder material layer 520a is transferred into the drying apparatus 430 by the substrate-transferring apparatus 410, and a drying process is performed.

The drying process is to remove a solvent in the retarder material layer 520a and is performed under relatively low temperatures such that the retarder material layer 520a is not thermally affected. In the drying process, a hot plate or an oven may be used, or natural drying may be performed. Beneficially, the drying process may be performed through a thermal radiation or thermal convection phenomenon using a far infrared heater or an oven. In the drying process, the temperature may be within a range of 25 degrees of Celsius to 80 degrees of Celsius. Beneficially, the drying process may be carried out under the temperature of 40 degrees of Celsius to 70 degrees of Celsius for 30 seconds to 30 minutes.

The substrate 510 including the dried retarder material layer 520a is transferred into the light-exposing apparatus 440 by the substrate-transferring apparatus 410, and a light-exposing process is performed to thereby form a patterned retarder 520 having first and second phase patterns 522 and 524.

The light-exposing process enables the retarder material layer 520a to have an optical anisotropic property by irradiating linearly-polarized light. The linearly-polarized light may have a wavelength of 200 nm to 400 nm. Desirably, the linearly-polarized light may have a wavelength within a range of 280 nm to 350 nm. At this time, the light exposure, that is, the exposed energy may be 1 mJ/cm$^2$ to 1000 mJ/cm$^2$. Beneficially, the exposed energy may be 2 mJ/cm$^2$ to 500 mJ/cm$^2$ such that the light-exposed retarder material layer 520a has the maximum anisotropic property.

In the light-exposing process, according to purposes, two exposing steps may be performed where the polarized lights have different polarization axes, and thus two areas having different retardation axes may be formed in the retarder material layer 520a. At this time, one or two masks may be used for patterning, and this will be explained later.

The substrate 510 including the patterned retarder 520 is transferred into the heat treatment apparatus 450, and a heat treatment process is carried out.

The heat treatment process increases the optical anisotropic property of the patterned retarder 520. In the heat treatment process, heat is not directly applied to the patterned retarder 520 such that the patterned retarder 520 is not thermally affected. Thus, a haze phenomenon that the patterned retarder 520 becomes hazy and opaque can be avoided, and a transparent film can be obtained within a range of visible rays. The heat treatment process, beneficially, may be performed through a thermal radiation or thermal convection phenomenon using a far infrared heater or an oven. The temperature in the heat treatment process, at which the patterned retarder 520 shows liquid crystal properties, is higher than the temperature in the drying process. In the heat treatment process, the temperature may be within a range of 80 degrees of Celsius to 150 degrees of Celsius. Beneficially, the heat treatment process may be carried out under the temperature of 90 degrees of Celsius to 110 degrees of Celsius for about 30 seconds to about 30 minutes.

The light-exposing process according to an exemplary embodiment of the present invention will be described with reference to FIGS. 9A to 9D, FIGS. 10A to 10D, and FIGS. 11A to 11D. FIGS. 9A to 9D, FIGS. 10A to 10D, and FIGS. 11A to 11D are schematic cross-sectional views of illustrating a pattern retarder in steps of a light-exposing process in a method of manufacturing the same according to an exemplary embodiment of the present invention.

FIGS. 9A to 9D show a light-exposing process using two masks.

Figure 9A:
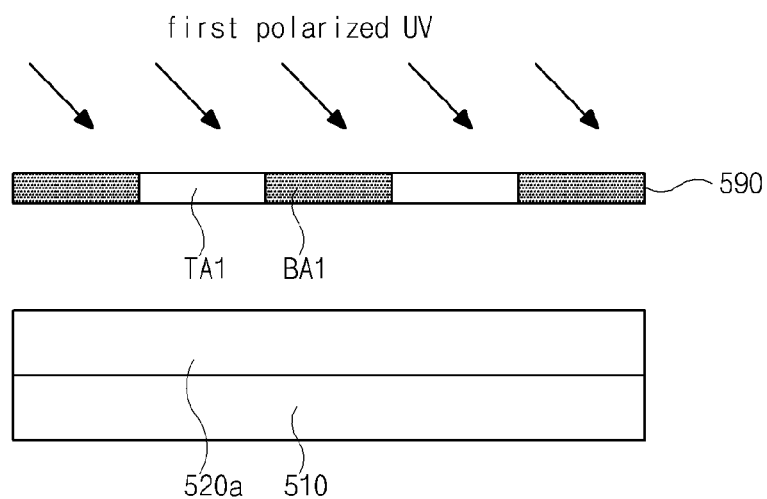
FIGS. 9A to 9D, FIGS. 10A to 10D, and FIGS. 11A to 11D are schematic cross-sectional views of illustrating a pattern retarder in steps of a light-exposing process in a method of manufacturing the same according to an exemplary embodiment of the present invention.

In FIG. 9A, a first mask 590 is disposed on a retarder material layer 520a, which is formed on a substrate 510 and then dried, and first polarized UV is irradiated to the retarder material layer 520a through the first mask 590. The first mask 590 includes first light-transmitting areas TA1 and second light-blocking areas BA1, which alternate each other.

Figure 9B:
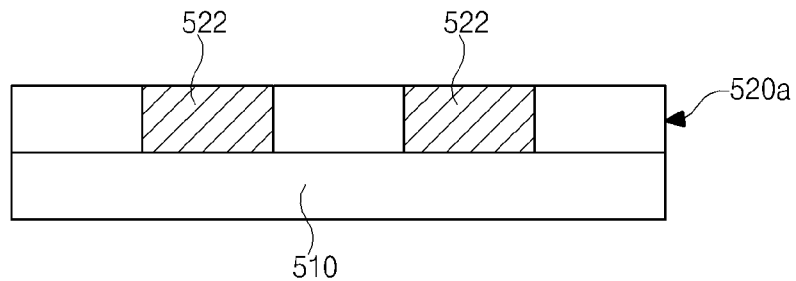

In FIG. 9B, first areas of the retarder material layer 520a corresponding to the first light-transmitting areas TA1 of the first mask 590 are exposed to the first polarized UV, and first phase patterns 522 having a first retardation axis are formed.

Figure 9C:
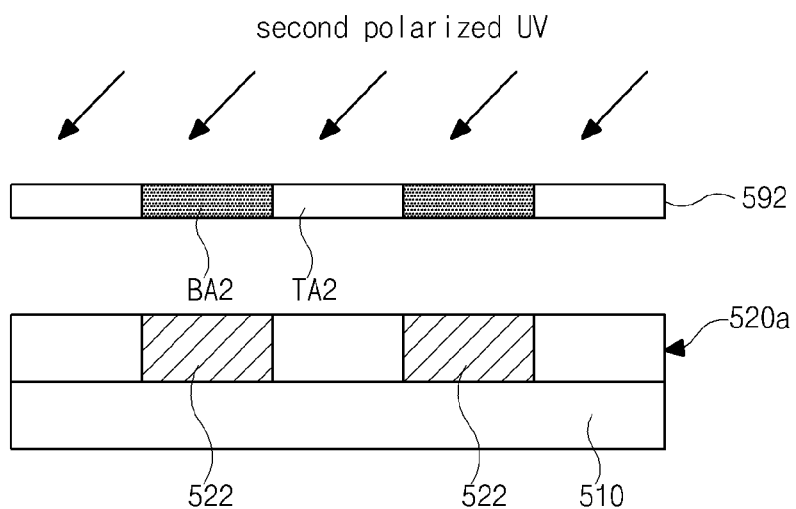

In FIG. 9C, a second mask 592 is disposed over the retarder material layer 520a including the first phase patterns 522, and second polarized UV is irradiated to the retarder material layer 520a through the second mask 592. Here, the second mask 592 includes second light-transmitting areas TA2 and second light-blocking areas BA2. The second light-transmitting areas TA2 of the second mask 592 correspond to the first light-blocking areas BA1 of FIG. 9A of the first mask 590 of FIG. 9A, and the second light-blocking areas BA2 of the second mask 592 correspond to the first light-transmitting areas TA1 of FIG. 9A of the first mask 590 of FIG. 9A.

Figure 9D:
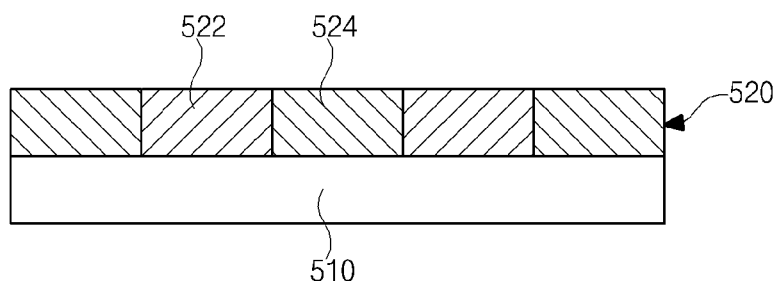

In FIG. 9D, the first areas of the retarder material layer 520a of FIG. 9C correspond to the second light-blocking areas BA2 of the second mask 592, and the first phase patterns 522 are maintained as they were. Second areas of the retarder material layer 520a of FIG. 9C corresponding to the second light-transmitting areas TA2 of the second mask 592 are exposed to the second polarized UV, and second phase patterns 524 having a second retardation axis are formed.

Here, the polarization axis of the second polarized UV is perpendicular to the polarization axis of the first polarized UV, and the second retardation axis is perpendicular to the first retardation axis.

Thus, by irradiating polarized UV twice using two masks, the patterned retarder 520 including the first and second phase patterns 522 and 524 having different retardation axes can be formed.

FIGS. 10A to 10D show a light-exposing process using a mask.

Figure 10A:
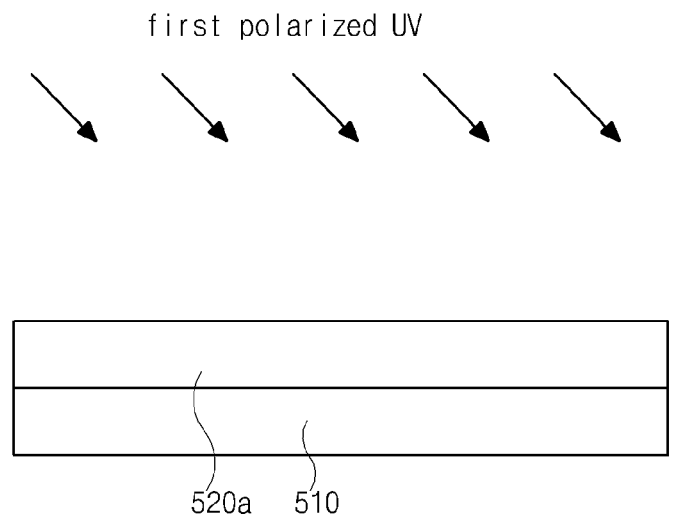

In FIG. 10A, first polarized UV is irradiated to all over a retarder material layer 520a, which is formed a substrate 510 and then dried.

Figure 10B:
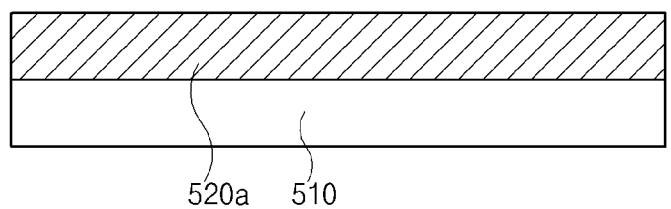

Therefore, in FIG. 10B, the retarder material layer 520a has a first retardation axis.

Figure 10C:
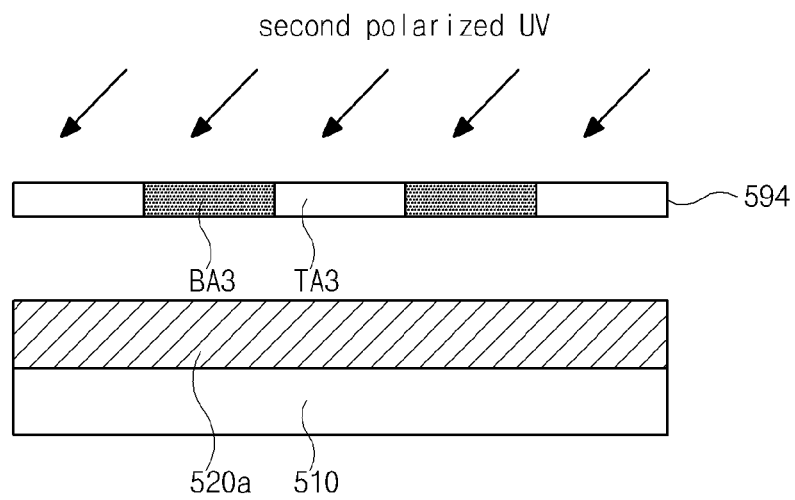

In FIG. 10C, a mask 594 is disposed over the retarder material layer 520a having the first retardation axis, and second polarized UV is irradiated to the retarder material layer 520a through the mask 594. The mask 594 includes light-transmitting areas TA3 and light-blocking areas BA3, which alternate each other.

Here, the polarization axis of the second polarized UV is perpendicular to the polarization axis of the first polarized UV, and the second polarized UV has a larger energy than the first polarized UV. Desirably, the energy of the second polarized UV is 1.5 to 10 times as large as the energy of the first polarized UV.

Figure 10D:
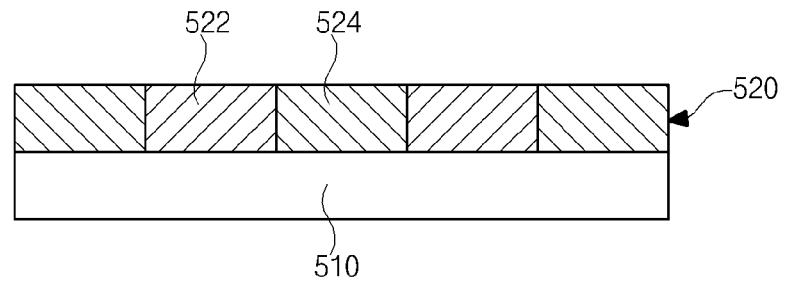

In FIG. 10D, first areas of the retarder material layer 520a of FIG. 10C corresponding to the light-blocking areas BA3 of the mask 594 are not exposed to the second polarized UV, and first phase patterns 522 having the first retardation axis are formed. Second areas of the retarder material layer 520a of FIG. 10C corresponding to the light-transmitting areas TA3 of the mask 594 are exposed to the second polarized UV, and second phase patterns 524 having a second retardation axis are formed. Here, the second retardation axis is perpendicular to the first retardation axis.

Thus, by irradiating polarized UV all over and then irradiating polarized UV using a mask, the patterned retarder 520 including the first and second phase patterns 522 and 524 having different retardation axes can be formed.

FIGS. 11A to 11D show a light-exposing process using a mask.

Figure 11A:
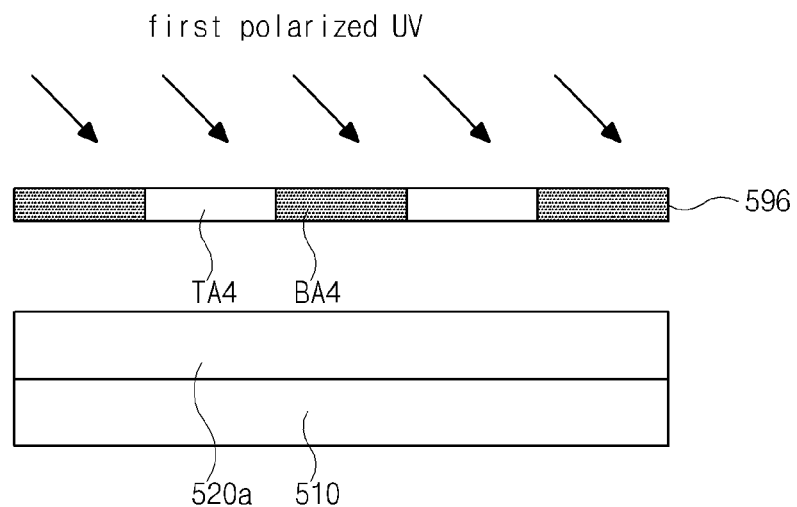

In FIG. 11A, a mask 596 is disposed on a retarder material layer 520a, which is formed on a substrate 510 and then dried, and first polarized UV is irradiated to the retarder material layer 520a through the mask 596. The mask 596 includes light-transmitting areas TA4 and light-blocking areas BA4, which alternate each other.

Figure 11B:
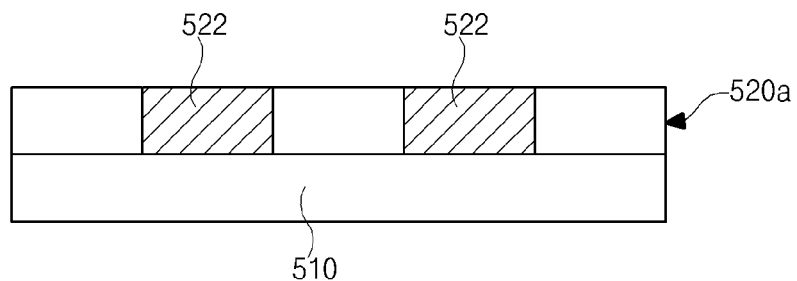

In FIG. 11B, first areas of the retarder material layer 520a corresponding to the light-transmitting areas TA4 of the mask 596 are exposed to the first polarized UV, and first phase patterns 522 having a first retardation axis are formed.

Figure 11C:
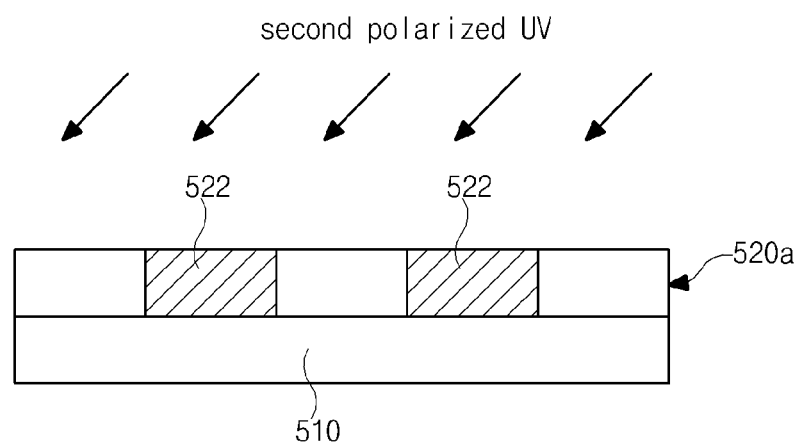

In FIG. 11C, second polarized UV is irradiated to all over the retarder material layer 520a including the first phase patterns 522. Here, the polarization axis of the second polarized UV is perpendicular to the polarization axis of the first polarized UV, and the second polarized UV has a smaller energy than the first polarized UV. Beneficially, the energy of the second polarized UV is 0.1 to 0.1 times as small as the energy of the first polarized UV.

Figure 11D:
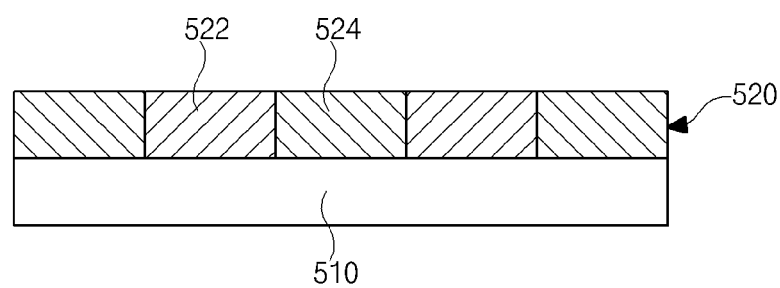

Therefore, in FIG. 11D, even though the first areas of the retarder material layer 520a of FIG. 11C are exposed to the second polarized UV, the first phase patterns 522 are maintained as they were. Second areas of the retarder material layer 520a of FIG. 11C corresponding to the light-blocking areas BA4 of the mask 596 of FIG. 11A are exposed to the second polarized UV, and second phase patterns 524 having a second retardation axis are formed. Here, the second retardation axis is perpendicular to the first retardation axis.

Thus, by irradiating polarized UV using a mask and then irradiating polarized UV all over, the patterned retarder 520 including the first and second phase patterns 522 and 524 having different retardation axes can be formed.

Here, the first and second polarized UV may be linearly-polarized UV.

In the above-mentioned embodiment, the first and second polarized UV having retardation axes perpendicular to each other may be irradiated. Alternatively, the first and second polarized UV may have the same retardation axis. In this case, the substrate 510 may be rotated by 90 degrees after a first irradiation, and then a second irradiation may be performed. To rotate the substrate 510, a stage (not shown) on which the substrate 510 is disposed can rotate, or an additional means for rotating the substrate 510 may be equipped.

Figure 12:
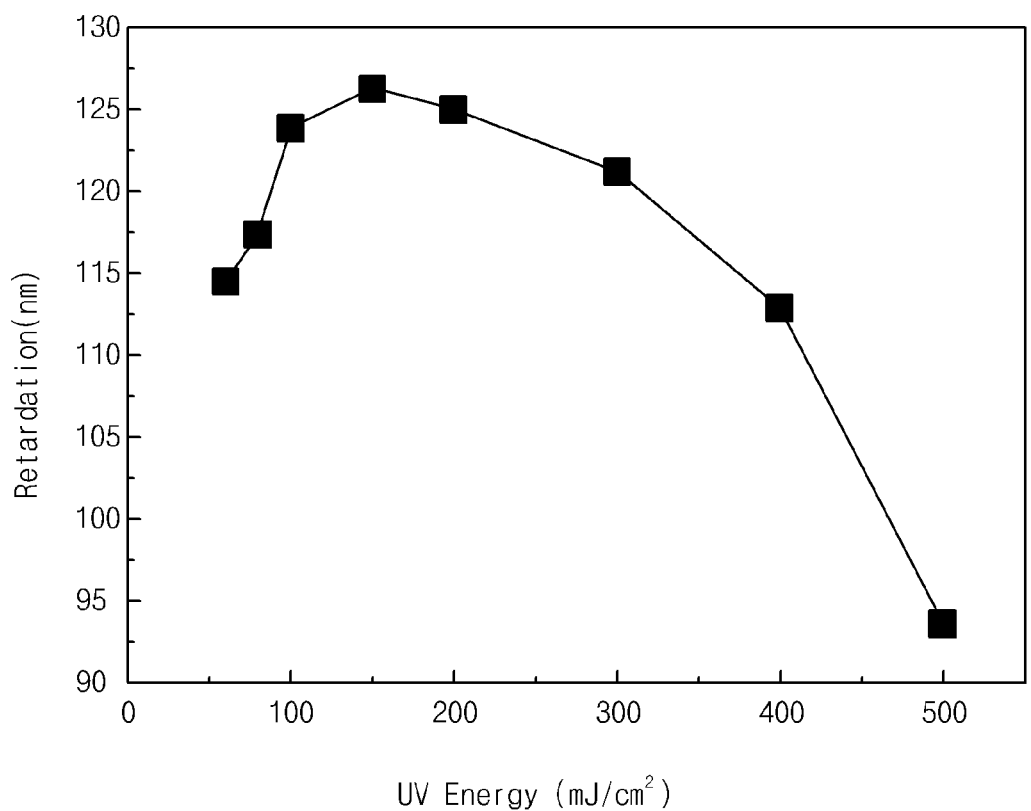
FIG. 12 is a graph of illustrating retardation values of a patterned retarder according to the third embodiment of the present invention depending on UV energy.

FIG. 12 is a graph of illustrating retardation values of a patterned retarder according to the third embodiment of the present invention depending on UV energy and shows the retardation values when UV energy is changed from 60 mJ/cm$^2$ to 500 mJ/cm$^2$.

At this time, a retarder material is applied, naturally dried for about 30 seconds, and dried in an oven of about 60 degrees of Celsius for about 5 minutes. Next, the retarder material is exposed to linearly-polarized UV having a wavelength of 280 nm to 340 nm, and is heat treated in an oven of about 100 degrees of Celsius for about 15 minutes.

In FIG. 12, when the exposed energy of the linearly-polarized UV, that is, UV energy is changed from 60 mJ/cm$^2$ to 150 mJ/cm$^2$, the retardation value increases with an increase of the UV energy. When the UV energy is larger than 150 mJ/cm$^2$, the retardation value decreases as the UV energy increases. Here, the retardation values are within a range of 112 nm to 128 nm and are close to 125 nm corresponding to $\lambda/4$.

Figure 13:
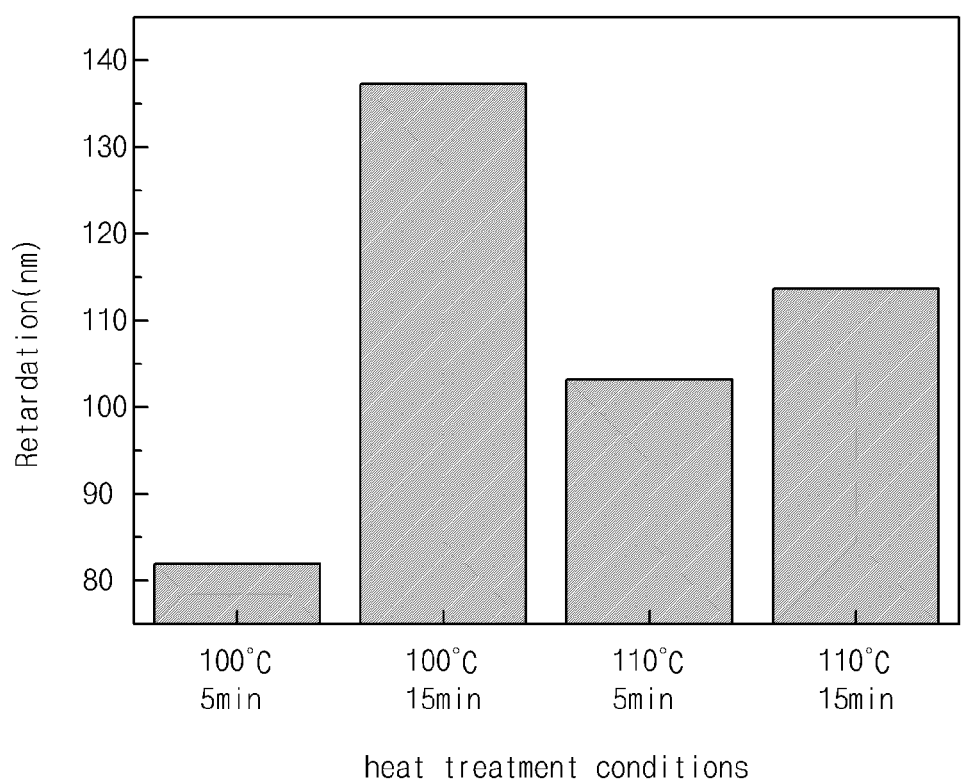
FIG. 13 is a graph of illustrating retardation values of a patterned retarder according to the third embodiment of the present invention depending on heat treatment conditions.

FIG. 13 is a graph of illustrating retardation values of a patterned retarder according to the third embodiment of the present invention depending on heat treatment conditions.

At this time, a retarder material is applied, naturally dried for about 30 seconds, and dried in an oven of about 60 degrees of Celsius for about 5 minutes. Next, the retarder material is exposed to linearly-polarized UV having a wavelength of 280 nm to 340 nm such that UV energy is about 100 mJ/cm$^2$, and is heat treated in an oven of.

In FIG. 13, heat treatment temperatures are 100 degrees of Celsius and 110 degrees of Celsius, and heat treatment times are 5 minutes and 15 minutes. Here, when the heat treatment times are the same, the retardation value increases for the same time as the heat treatment temperature gets high. When the heat treatment temperatures are the same, the retardation value increases as the heat treatment time gets long.

The patterned retarder manufactured according to the above-mentioned method may be divided into unit patterned retarders having predetermined sizes by cutting the patterned retarder using a laser beam. An antireflection layer is formed on or an antireflection film is attached to the unit patterned retarder, and thus a unit patterned retarder having a reflection-preventing function can be manufactured.

In the method of manufacturing the patterned retarder according to the present invention, the photoalignment layer is not necessary. Therefore, the processes of applying the photoalignment layer and drying and curing it can be omitted, and the manufacturing processes are simplified. The manufacturing costs are reduced.

In addition, by optimizing the process conditions, the patterned retarder having the desirable retardation value can be manufactured.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a patterned retarder, comprising:
   forming a single retarder material layer by applying a retarder material to a substrate;
   drying the single retarder material layer at a first temperature;
   exposing the single retarder material layer to linearly-polarized UV, wherein the single retarder material layer has an optical anisotropic property;
   heat treating the single retarder material layer at a second temperature higher than the first temperature to increase the optical anisotropic property of the single retarder material layer, and
   dividing the patterned retarder into unit patterned retarders by cutting the patterned retarder using a laser beam,
   wherein exposing the single retarder material layer to the linearly-polarized UV includes irradiating first polarized UV to the single retarder material layer and irradiating second polarized UV to the single retarder material layer,
   wherein the first polarized UV is irradiated to all over the single retarder material layer, and the second polarized UV is irradiated to the single retarder material layer through a mask including light-transmitting portions and light-blocking portions, which alternate each other,
   wherein an energy of the second polarized UV is larger than an energy of the first polarized UV,
   wherein the retarder material includes a photosensitive group, which shows the optical anisotropic property when the linearly-polarized light is exposed thereto, and a liquid crystal polymer, a liquid crystal monomer, an oligomer or a mixture thereof having a mesogen group, which shows a liquid crystal property within a range of predetermined temperatures,
   wherein the linearly-polarized UV has an energy of 60 mJ/cm$^2$ to 400 mJ/cm$^2$ and a wavelength of 280 nm to 340 nm,
   wherein heat treating the single retarder material layer is performed through a thermal radiation or thermal convection phenomenon using a far infrared heater or an oven and is carried out under the temperature of 80 degrees Celsius to 150 degrees Celsius for 30 seconds to 30 minutes, and
   wherein the single retarder material layer exposed to the linearly-polarized UV and heat treated has a retardation value between 112 nm and 128 nm.

2. The method according to claim 1, wherein the retarder material further includes a leveling additive agent for flattening.

3. The method according to claim 1, wherein the single retarder material layer exposed to the linearly-polarized UV has a retardation axis, and the retardation axis is perpendicular to a polarization axis of the linearly-polarized UV.

4. The method according to claim 3, wherein the single retarder material layer exposed to the linearly-polarized UV includes first and second phase patterns having different retardation axes.

5. The method according to claim 4, wherein irradiating the first polarized UV is performed before irradiating the second polarized UV, and the energy of the second polarized UV is 1.5 to 10 times as large as the energy of the first polarized UV.

6. The method according to claim 4, wherein irradiating the second polarized UV is performed before irradiating the first polarized UV, and the energy of the first polarized UV is 0.1 to 0.9 times as small as the energy of the second polarized UV.

7. The method according to claim 1, wherein forming the single retarder material layer uses one of a spin-coating method, a slit-coating method, a doctor blade method, a spin and slit coating method, a roll-to-roll coating method and a cast coating method, and the single retarder material layer has a thickness less than 5 micrometers.

8. The method according to claim 1, wherein the substrate includes one of glass, plastic, polymethyl methacrylate, polycarbonate, polyvinyl chloride, triacetyl cellulose and cyclo olefin polymer.

9. The method according to claim 1, wherein drying the single retarder material layer is performed through a thermal radiation or thermal convection phenomenon using the far infrared heater or the oven and is carried out under the temperature of 25 degrees Celsius to 80 degrees Celsius for 30 seconds to 30 minutes.

10. The method according to claim 1, further comprising:
forming an antireflection layer or attaching an antireflection film to each unit patterned retarder.

* * * * *